United States Patent [19]
Pichot

[11] Patent Number: 5,765,276
[45] Date of Patent: Jun. 16, 1998

[54] TOOL CONNECTABLE TO A ROBOT FOR THE AUTOMATIC INSTALLATION OF A SEALING JOINT

[75] Inventor: Bertrand Pichot, Bondoufle, France

[73] Assignees: Automobiles Peugeot, Paris; Automobiles Citroen, Neuilly sur Seine, both of France

[21] Appl. No.: 598,944

[22] Filed: Feb. 9, 1996

[30] Foreign Application Priority Data

Feb. 10, 1995 [FR] France ................................ 95 01585

[51] Int. Cl.$^6$ .................................................. B23P 21/00
[52] U.S. Cl. ......................................... 29/717; 29/235
[58] Field of Search ........................... 29/717, 721, 235, 29/450, 451, 407.09, 407.1

[56] References Cited

U.S. PATENT DOCUMENTS

| | | | |
|---|---|---|---|
| 5,169,081 | 12/1992 | Goedderz | 29/235 |
| 5,201,106 | 4/1993 | Moore et al. | 29/717 |
| 5,237,741 | 8/1993 | Goedderz | 29/235 |
| 5,243,747 | 9/1993 | Mesnel et al. | 29/235 |

FOREIGN PATENT DOCUMENTS

| | | | |
|---|---|---|---|
| 0 149 806 | 7/1985 | European Pat. Off. . | |
| 212070 | 3/1987 | European Pat. Off. | 29/235 |
| 0 451 023 | 10/1991 | European Pat. Off. . | |
| 0 503 992 | 9/1992 | European Pat. Off. . | |
| 0 514 228 | 11/1992 | European Pat. Off. . | |
| 2 527 499 | 12/1983 | France . | |
| 2 695 587 | 3/1994 | France . | |
| 3541865 | 6/1987 | Germany | 29/235 |
| 2 237 936 | 5/1991 | United Kingdom . | |

*Primary Examiner*—David P. Bryant
*Attorney, Agent, or Firm*—Burns, Doane, Swecker & Mathis, L.L.P.

[57] ABSTRACT

The present invention concerns a tool connectable to a robot for automatic installation of a sealing joint in a fillister or groove. The tool can be used, for example, for the automatic installation of a sealing joint around a vehicle door. The tool includes a frame designed to be attached to the wrist of a robot, and to which a functioning part of the tool is pivotally attached. The functioning part works in conjunction with the frame by means of pneumatic jacks which flexibly and precisely adapt the motion of the tool to the contour of the joint or of the element housing the joint along the path which the robot causes the tool to follow.

20 Claims, 3 Drawing Sheets

TOOL CONNECTABLE TO A ROBOT FOR THE AUTOMATIC INSTALLATION OF A SEALING JOINT

BACKGROUND OF THE INVENTION

1. Field of the Invention

The present invention relates to a tool connectable to a robot for the automatic installation of a sealing joint, and more particularly, to a tool for installation of a sealing joint in a fillister or groove.

2. Description of the Related Art

Disclosures have previously been made of tools connectable to the wrist of a robot, of which the head is fitted with vibrating hammers in order to permit the mounting of a sealing joint in a fillister or groove. The robot enables the tool to describe a path corresponding to the shape of the fillister in which the sealing joint is to be inserted and mounted. An example of a sealing joint which is mounted in a fillister is the resilient sealing strip which extends around a car door for providing a seal between the car door and the door frame.

However, the known tool secured to the wrist of the robot forms a rigid assembly, lacking flexibility and/or elasticity, so that the tool cannot absorb or adapt itself with precision to the irregularities of the shape of the joints or of the fillister in which the joints are mounted during the path of the tool as dictated by the robot. Consequently, mounting the joint in the fillister with the known tools can produce defects.

SUMMARY OF THE INVENTION

The present invention is intended to address the problems of the known tools by proposing a tool which ensures automatic, and precise mounting of a sealing joint in the fillister of any component without regard to possible shape-related irregularities of the joint and of the fillister housing the joint.

To this end, the invention relates to a tool that can be connected to a robot for the automatic installation of a sealing joint or comparable part, such as a vehicle door-entry joint. The tool includes a frame intended to be attached to the wrist of a robot, and a functioning part of the tool pivotally attached to the frame. The functioning part works in conjunction with the frame using flexibly-adaptable means for controlling the movement of the tool so as to follow the contour of the joint and of the component housing said joint over the course of the path which the robot causes the tool to follow.

According to another feature of the invention, the functioning part is joined to a frame shaft for rotation in a direction orthogonal to the direction of the force exerted on the joint in order to mount it in position.

The frame is fitted with pneumatic or comparable jacks. The pistons of the jacks work in conjunction with the functional part of the tool. The jacks form a mechanism for controlling the motion of the tool so as to match the shape of the joint or of the part housing this joint, whatever the shape thereof. According to another aspect of the invention, the functional part of the tool is held in position laterally by rollers fastened to the frame.

Furthermore, the tool includes at least one detector which registers defects in the motion of the functional part of the tool in relation to the frame. The detector is connected to the frame and works in conjunction with a cam or comparable part fastened to the functional part of the tool. The tool also includes a device, for example a screw, which locks the functioning part of the tool in place on the frame.

According to a preferred embodiment of the invention, the functioning part of the tool incorporates a head equipped with vibrating hammers and at least one cage for housing the joint. The cage is preferably formed from a series of stationary fingers and one mobile finger allowing the cage to be opened and closed. The mobile finger is actuated by a jack made integral with the functioning part of the tool. This mobile finger passes through a part secured to the head of the functional part. The part prevents the mobile finger from turning around the shaft of the aforementioned jack. The mobile finger and the stationary fingers are preferably mounted so as to rotate freely around their axes on the head of the functioning part of the tool.

The tool according to this invention preferably includes a detector fitted on the head of the functioning part for recording the presence or absence of the joint in the cage. According to a preferred embodiment of the invention, the head of the functioning part of the tool includes two cages aligned and arranged symmetrically opposite each other along a first axis, and two vibrating hammers aligned and arranged symmetrically opposite each other along a second axis orthogonal to the first axis.

The vibrating hammers are preferably attached to a crank shaft driven in rotation by a motor, which can be actuated manually by a button or similar device. The button allows the hammers to be drawn into the starting reference position, i.e., the raised position manually.

BRIEF DESCRIPTION OF THE DRAWING FIGURES

Other advantages and features of the invention will emerge more fully from the following detailed description provided with reference to the attached drawings, which are supplied solely as examples and in which.

DETAILED DESCRIPTION

Figure 1:
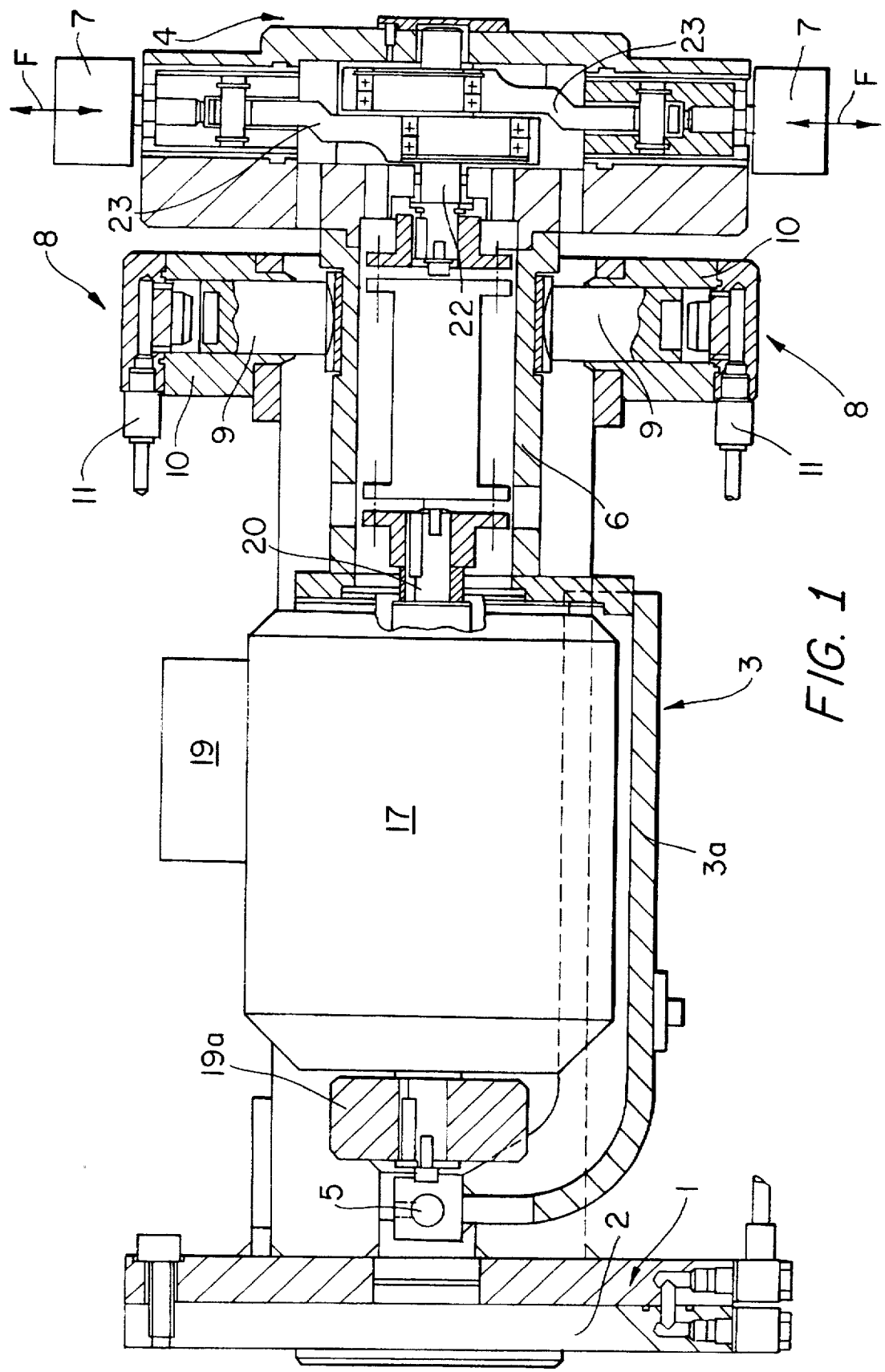
FIG. 1 is a diagrammatic cross-sectional side view of an automatic joint-installation tool, in accordance with the principles underlying the invention.
Figure 2:
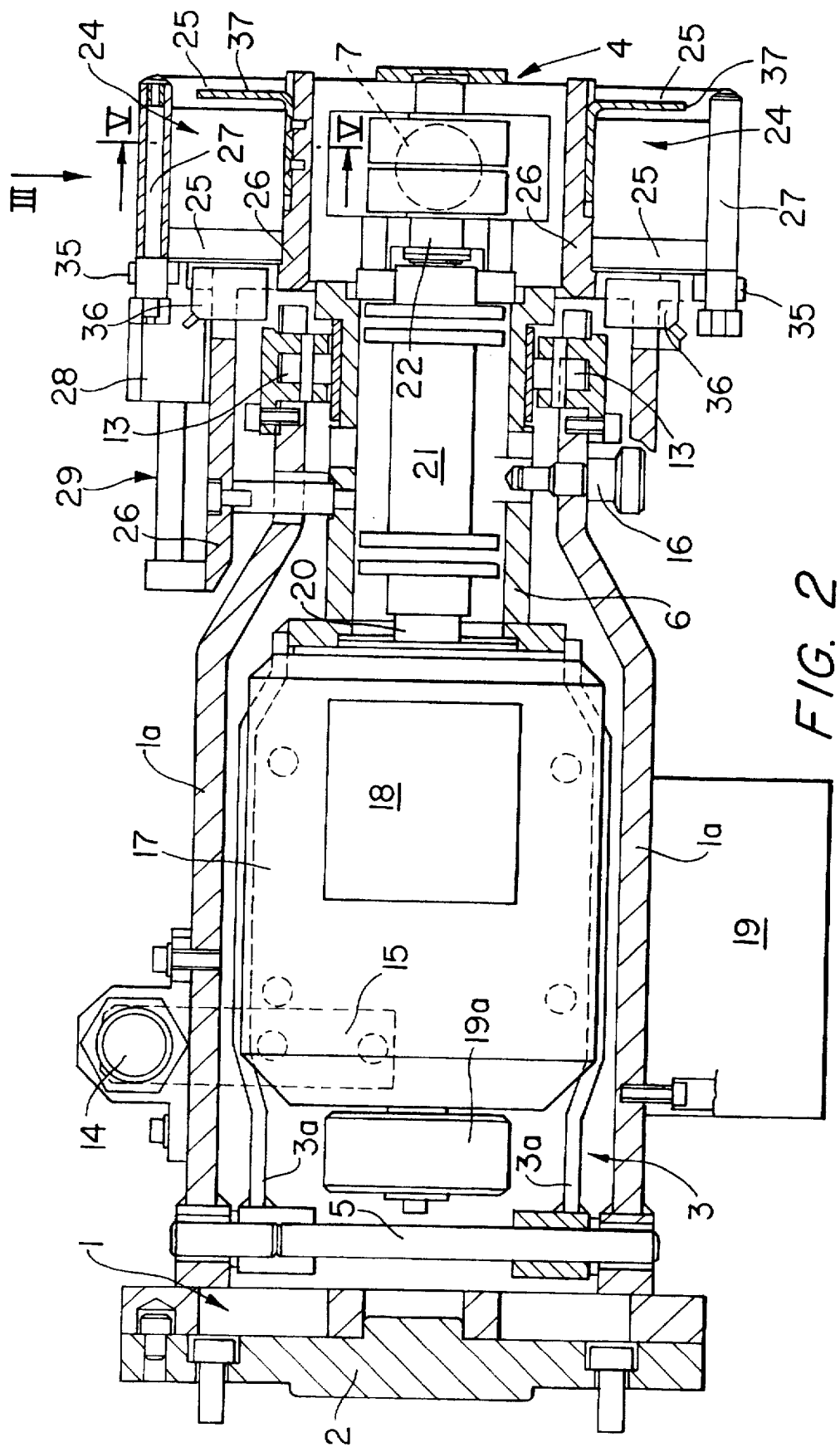
FIG. 2 is a cross-sectional top view of the tool of FIG. 1.

FIGS. 1 and 2, in particular, show an automatic joint-installation tool according to the present invention which includes a frame 1 whose rear portion is attached by means of an interface component 2 to a wrist of a robot (not shown), in order to provide pneumatic links between the robot and the tool. A functional part 3 is attached to the frame by a joint. The functional part 3 includes a working head 4 on the right-hand part of FIGS. 1 and 2.

In the example shown in FIGS. 1 and 2, the functional part 3 of the tool basically consists of two arms 3a, the first ends of which are pivotally attached to a shaft 5 which is secured to the frame 1. The other ends of the arms 3a join a housing or similar part 6 supporting the working head 4 of the tool.

As FIGS. 1 and 2 illustrate, the shaft 5 of the frame 1 is mounted between two arms or similar components forming the main part of the frame. The shaft 5 is positioned orthogonal to the direction of a force exerted by vibrating hammers 7 fastened to the working head 4, this direction is shown by arrows F in FIG. 1.

The functional part 3 of the tool includes the arms 3a, the housing 6, and the working head 4 supporting the vibrating hammers 7. The functional part 3 can pivot in either direction around the shaft 5 in relation to the frame 1.

More specifically, as is clearly shown in FIG. 1, the frame 1 is equipped with opposing pneumatic jacks 8 whose pistons 9 work in conjunction with the functional part 3 of the tool, and, more precisely, with the housing 6, which forms a portion of the functional part. A body 10 of each of the pneumatic jacks 8, forms a portion of the frame 1 and includes compressed air-intake connectors 11.

The functional part 3 of the tool is flexibly mounted for rotation about the shaft 5. The pneumatic jacks 8 form a control mechanism for control of the flexible or elastically resilient movement of the tool. The pneumatic jacks 8 control the movement of the functional part 3 in conformity with the shape of the fillister of the element (not shown) housing the sealing joint. The sealing joint 12 is illustrated by way of example in FIG. 4.

The present invention in which the functional part 3 is flexibly connected to the frame 1 and is actuated by the pneumatic jacks 8 fastened to the frame, advantageously makes it possible eliminate the weight of the tool and to generate a constant force on the joint 12 by means of the vibrating hammers 7. As will be described below when the operation of the invention is discussed, the head 4 of the tool will automatically register the shape of the fillister of the component housing the joint, or else the joint itself, even when the joint incorporates shape-related irregularities. In fact, the force exerted on the joint by the vibrating hammers 7 will be solely a function of the gas pressure generated in the jacks 8 and will not be affected by shape irregularities.

As shown in FIG. 2, the ends of the arms 1a of the frame 1 are equipped with rollers 13 which rest on the exterior of the housing 6, so that the functional part 3 incorporating the housing 6 is held in place laterally as it rotates around the shaft 5 in relation to the frame 1. As explained above, the rotation of the functional part 3 is caused by the pneumatic jacks 8. As shown in FIGS. 1 and 2, the two rollers 13 are placed symmetrically opposite each other on either side of the housing 6 and are aligned on an axis orthogonal to that of the two pneumatic jacks 8. A detector 14, as shown in FIG. 2, is mounted integrally with one of the arms 1. A cam 15 or comparable device is mounted integrally with one of the arms 3a of the functional component 3 and extends to a position opposite the detector 14. In this way, the detector 14 allows detection of defects in the position or path of the functional part 3 of the tool and may, for example, indicate an excessively-large gap between this functional part and the frame 1.

FIG. 2 also illustrates a screw 16 fastened to an opposite arm 1a of the frame 1 from the arm on which the detector 15 is mounted. The screw 16 allows the housing 6 and thus, the functional part 3, to be locked in position on the frame 1. This locking system allows determination of a reference, or starting, position of the functioning element 3. In other words, the locking system determines a relative position of the functioning part 3 in relation to the frame 1. The locked position is commonly termed the zero tool setting.

As shown in FIGS. 1 and 2, an electric motor 17 is mounted on the functional part 3 between the arms 3a. Reference 18 shows schematically the positioning of the electrical connections for the motor, and reference 19, the position of the electrical connections feeding the functional element 3.

The motor 17 may be driven manually in rotation by a button or similar device 19a, so that the hammers 7 can be drawn into the starting reference position, which is preferably the raised position illustrated in FIG. 1.

An output shaft 20 of the motor 17 is connected by means of a coupling 21 positioned in the housing 6 to a crankshaft 22. As shown in FIG. 1, rotation of the crankshaft 22 causes alternating translational motion, of connection rods 23 mounted on the crankshaft in the working head 4. The alternating movement of the connection rods 23 causes motion of the hammers 7 mounted on the ends of the connection rods 23.

In the embodiment of the invention shown in the drawing figures, the head 4 of the functional part 3 comprises two hammers 7 aligned and set symmetrically opposite each other (FIG. 1) along an axis, as well as two cages 24 aligned and set symmetrically opposite each other (FIG. 2) along an axis orthogonal to the aforementioned axis.

Figure 4:
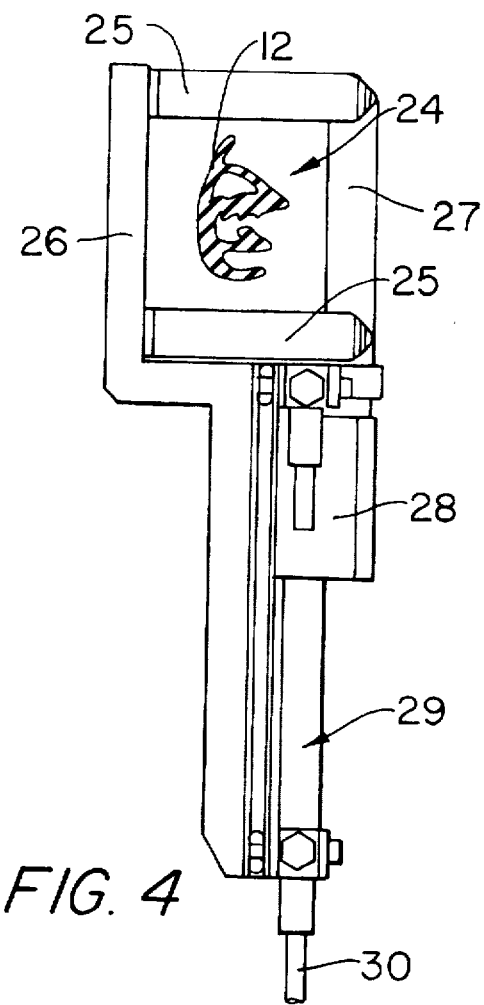
FIG. 4 is another view of the tool head, in the direction of arrow IV in FIG. 3.

As shown in FIG. 4, each cage 24 is equipped to hold a sealing joint 12. Each cage includes a series of five fingers including four stationary fingers 25 attached to a base 26 made integral with the head 4 of the functional part 3, and one mobile finger 27 allowing the cage 24 to be closed and opened.

Accordingly, each cage 24 forms a passage having a rectangular cross-section and delimited by the four stationary fingers 25. The mobile finger 27 can be retracted by longitudinal translational motion along its axis, in order to allow the cage to be opened to permit the insertion of the joint 12, and to be closed to hold the joint in position and guide it.

It will be observed here that fingers 25 and 27 are mounted so as to rotate freely around their axes, thereby facilitating the motion of the joint 12 through the cage 24. Each of the fingers 25 may, for example, be formed from a tube made of a synthetic material rotating on a shaft made integral with the base 26.

Figure 3:
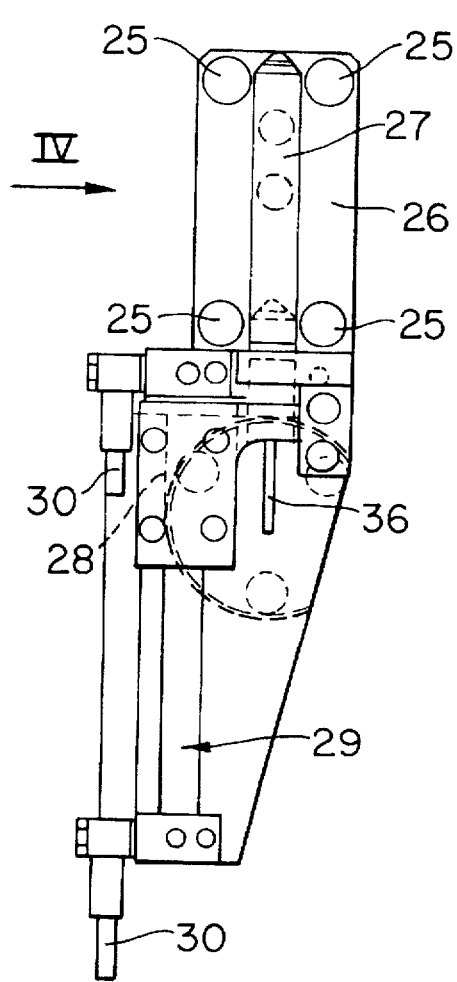
FIG. 3 is a side view of a head of the tool in the direction of arrow III in FIG. 2.
Figure 6:
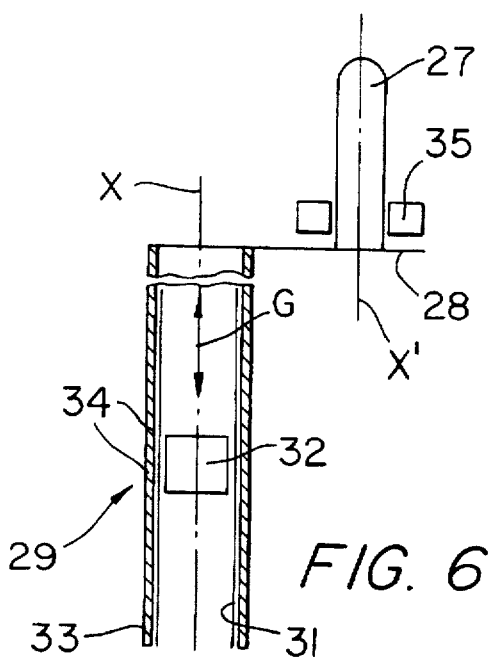
FIG. 6 is a partial diagrammatic, enlarged view of the jack for actuating the mobile finger and allowing the opening and closing of the cage housing the joint to be installed.

As shown in FIGS. 3, 4, and 6, the mobile finger 27 may be moved in translational motion by a square-shaped part 28. The mobile finger 27 is actuated by a jack 29, which is shown partially and schematically in FIG. 6.

The jack 29 is preferably a shaftless pneumatic jack, for which the feeds 30 are shown in FIGS. 3 and 4. FIG. 6 illustrates the jack 29 including a cylinder 31 which houses, in a sliding configuration, a piston 32 made of a magnetic material and driven in the direction of arrow G by gas pressure from the feeds 30. Positioned coaxially outside the cylinder 31 is a tube or similar component 33 which constitutes a kind of external piston capable of sliding on the cylinder 31 and supporting the square-shaped part 28 to which the mobile finger 27 is attached. The external piston 33 is equipped with collars or comparable devices 34 which are magnetically attracted to the piston 32 and seal off magnetic flux.

The movement of the magnetic piston 32 in the cylinder 31 causes the movement of the exterior piston 33 due to the magnetic coupling between the piston 32 and the exterior piston 34. Thus, the pneumatic operation of the piston 32 moves the finger 27, which opens or closes the cage 24. It is noted here that the finger 27 is mounted so as to slide axially in a part 35 fastened to the head 4 of the functional part 3 of the tool. As shown in FIG. 6, the finger 27 can rotate freely around its axis X' on the square part 28. However, the part 35 prevents the finger 27 from rotating around the axis X of the jack 29, which is offset in relation to the axis X'. In other words, the rotation of the external piston 33 of the jack 29 is prevented.

Figure 5:
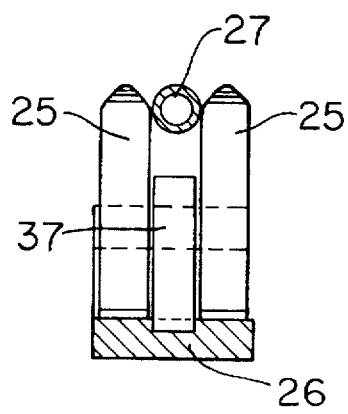
FIG. 5 is a cross-section made substantially along line V—V in FIG. 2.

FIGS. 2, 3, and 5 further show that the head 4 of the tool is equipped with a detector recording the presence or absence of the joint 12 in the cage 24. This detector includes a cell 36 containing an infrared ray transmitter/receiver and a reflector 37 positioned, opposite the cell. The presence of the joint 12 inside the cage 24 will break the infrared ray, whether the finger 27 is in the closed or open position of the cage 24. A system-control mechanism is informed of the presence or absence of the joint and permits or prevents the start of a machine cycle, or may validate a sequence of steps in the process.

To ensure better understanding of the present invention, the operation of the tool will now be briefly explained.

The jack 29 controls retraction of the finger 27, thereby opening the cage 24 and allowing insertion of the joint 12 into the cage. The jack 29 then causes the cage to close by means of the finger 27, in such a way that the joint 12 is held in position and guided through the cage as it is being mounted in the fillister (not shown) of a part such as a vehicle door entry.

More specifically, a free end of the joint is mounted manually in the fillister, then the tool moves automatically along the fillister along a path controlled by the robot and matching the contour of the fillister. The vibrating hammers 7 function during the motion of the tool so as to automatically mount the joint in the fillister as the joint leaves its cage.

In addition, as explained at the beginning of this description, the tool advantageously "absorbs" all of the irregularities of shape of the fillister or even of the joint, by virtue of the potential relative motion of the functional part of the tool in relation to the frame of this tool, which is secured to the wrist of the robot. In fact, this relative motion as controlled by the robot by means of the pneumatic jacks 8, makes it possible to adapt, flexibly and precisely, the motion of the tool to the contour of the fillister and/or of the joint during the course of the path the robot dictates to the tool.

The invention is not limited to the embodiment described and illustrated solely as an example. It will be apparent to one skilled in the art that invention encompasses various modifications including all technical equivalents of the means described, as well as combinations thereof.

What is claimed is:

1. A tool connectable to a robot to allow automatic installation of a sealing joint comprising:
   a frame for connection to the wrist of a robot;
   a functional part attached to the frame for pressing a sealing joint into a fillister; and
   means resiliently controlling the movement of the functional part with respect to the frame such that the functional part adapts to the contour of the sealing joint and a component housing into which the sealing joint is installed.

2. The tool according to claim 1, wherein said functional part is rotatably mounted on a shaft of the frame.

3. The tool according to claim 2, wherein the shaft allows rotation of the functional part in a direction which is orthogonal to a direction of force generated on the sealing joint by the functional part.

4. The tool according to claim 2, wherein the frame is equipped with pneumatic jacks having pistons which provide the means for resiliently controlling the movement of the functional part.

5. The tool according to claim 2, wherein the functional part is held in place laterally by rollers mounted on the frame.

6. The tool according to claim 2, further comprising at least one detector for recording defects of motion of the functional part in relation to the frame, the detector being connected to the frame and working in conjunction with an element attached to the functional part.

7. The tool according to claim 2, further comprising a locking mechanism for ensuring that the functional part is locked in place on the frame.

8. The tool according to claim 1, wherein the frame is equipped with jacks having pistons which provide the means for resiliently controlling the movement of the functional part.

9. The tool according to claim 8, further comprising at least one detector for recording defects of motion of the functional part in relation to the frame, the detector being connected to the frame and working in conjunction with an element attached to the functional part.

10. The tool according to claim 1, wherein the functional part is held in place laterally by rollers mounted on the frame.

11. The tool according to claim 1, further comprising at least one detector for recording defects of motion of the functional part in relation to the frame, the detector being connected to the frame and working in conjunction with an element attached to the functional part.

12. The tool according to claim 1, further comprising a locking mechanism for ensuring that the functional part is locked in place on the frame.

13. The tool according to claim 1, wherein the functional part comprises a head equipped with vibrating hammers and at least one cage for holding the sealing joint.

14. The tool according to claim 13, wherein the cage is formed from a series of stationary fingers and a mobile finger allowing the cage to be opened and closed.

15. The tool according to claim 14, wherein said mobile finger is actuated by a jack integral with the functional part.

16. The tool according to claim 15, wherein the mobile finger passes through a part attached to the head of the functional part, wherein the part prevents said mobile finger from rotating around an axis of the jack.

17. The tool according to claim 14, wherein the mobile finger and the stationary fingers are mounted to rotate freely around their axes on the head of the functioning part.

18. The tool according to claim 13, wherein the head of the functioning part is equipped with a detector which records the presence and absence of the sealing joint in said cage.

19. The tool according to claim 13, wherein the head of the functioning part comprises two cages aligned and set symmetrically opposite each other along a first axis and two vibrating hammers aligned and set symmetrically opposite each other along a second axis orthogonal to the first axis.

20. The tool according to claim 13, wherein the vibrating hammers are secured to a crankshaft driven in rotation by a motor that can be actuated manually by a button or similar device.

* * * * *